July 30, 1940.  V. STERENTAL  2,209,481

MELTING, CONVERTING, AND REFINING METALS

Filed Dec. 8, 1938

Inventor:
Volf Sterental
by David Rines.
Attorney

Patented July 30, 1940

2,209,481

UNITED STATES PATENT OFFICE 2,209,481

MELTING, CONVERTING, AND REFINING METALS

Volf Sterental, Turin, Italy, assignor of three-fourths to Davide Jona, Giulio Jona, and Raffaele Jona, all of Turin, Italy Application December 8, 1938, Serial No. 244,648
In Italy December 17, 1937

1 Claim. (Cl. 75—63)

This invention has for its object a process by which it is possible to effect, without any transfer of the material under treatment, the melting conversion and refining of copper from residues of mechanical manufacture of copper and zinc alloys and recovery of zinc in form of zinc oxide.

These residues and waste products are generally melted in the furnace and transferred and refined in the converter; the latter is subject to cool down and therefore the refining, which is started in the converter, is completed in the reverberatory furnace.

According to this invention the same melting furnace serves subsequently as reverberatory, converting and refining furnace so that an economy in hand work, fuel and material is obtained and the residual heat and by-products may be recovered. The furnace is substantially constituted by a large retort of refractory material rotatably mounted on trunnions so that it may be brought into different positions within a range of 90° or more. The retort is provided near its bottom with the usual blower and in proximity to the upper feed opening with one or more burners and at a certain distance from the latter, with a wide delivery opening for the combustion products. The retort is charged with the material to be melted to which substances adapted to produce on oxidising a considerable heat are added, then the door is closed and the retort is rotated in such manner as to bring the burner upwards and melting is started by means of said burner. Once the melting of the charge is started, working of the burner is stopped while the blower is operated and the retort is gradually brought towards its vertical position and kept during conversion in such position that as the metal melts it forms a coating of a few centimeters thickness over the blower nozzles.

The furnace during this time works as a converter and melting is effected owing to the heat produced by exothermal reactions of oxidation while the combustion products are collected, cooled, condensed and recovered. When, at a certain stage of the process, the metal on reaching a certain concentration tends to cool, the retort is returned to its horizontal position, the blower is operated and blows the air on the melting bath. During this third stage the furnace works as a reverberatory furnace effecting an oxidising melting and refining of the metal is continued; on removal of gases and reduction the metal is melted into cakes or ingots to supply to the trade.

The annexed drawing shows diagrammatically the invention.

Figure 1:
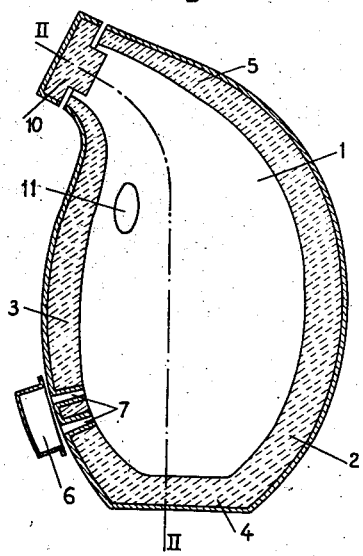
Fig. 1 is a section of the retort perpendicular to the axis of the rotating trunnions.
Figure 2:
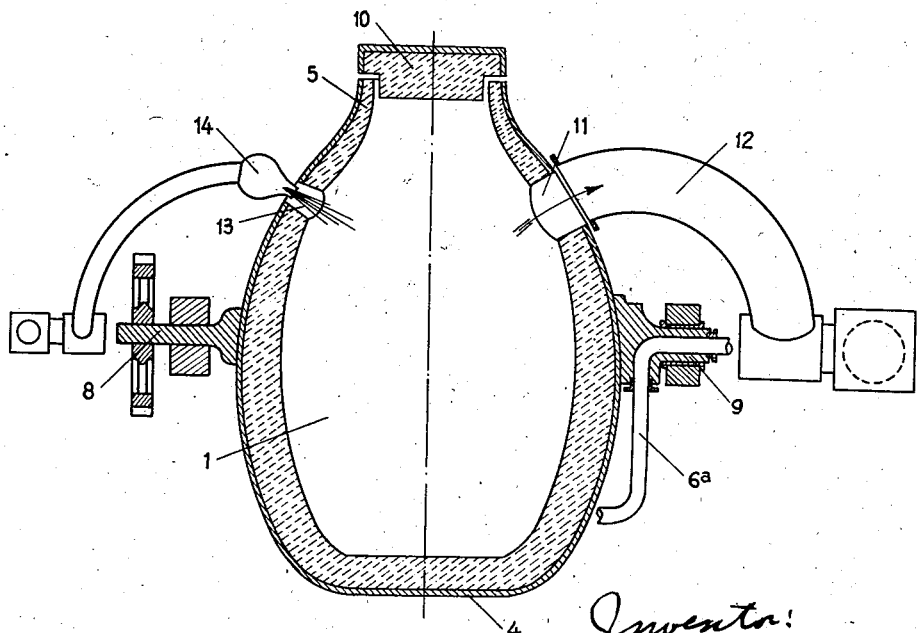
Fig. 2 is a conventional section of the oscillating trunnions approximately in the plane II—II of Fig. 1.

The furnace as illustrated is broadly in the form of a steel retort with an inner lining of acid or basic refractory material according to the desired use.

The chamber 1 is limited by a belly portion 2 and a back portion of substantially flat cross section, a bottom 4 and a neck 5 bent towards the back portion through which the furnace is charged. The back portion is provided in proximity to the bottom with a blower 6 and nozzles 7. The furnace is provided midway between belly and rear portion with trunnions 8 and 9, on which the furnace may rotate through 90° or more, taking a horizontal position with its belly downwards; the furnace is provided with a door 10, which must be tight-sealed once the furnace has been charged. In the upper part of the back portion there are two openings: a wide one 11 into which opens a conduit 12 and a smaller one 13, in which opens the nozzle of a burner 14. The conduit 6a of the blower, conduit 12 and the conduit of the burner 14 are all rotatably connected on the axis of the trunnions, so that the furnace may be brought to any inclined position even during operation of the conduits. The conduit 12, owing to the fact that the door 10 is tight-closed, carries the volatile and combustion products into condensers and arrangements for recovering the heat of the combustion products. The burner nozzle is so positioned that the flame is thrown into a whirling motion ensuring a thorough and uniform combustion.

The melting and refining process carried out in the above described furnace is as follows:

If, for instance, residues (turnings, chips, etc.) of copper alloys, such as brass, are to be treated, the furnace is so rotated as to bring its belly downwards; the material is charged adding suitable slag-forming and other substances (iron, silicon, manganese, etc.) adapted to develop a strong heat during oxidation and the melting is started by means of the burner. When part of the charge is melted and the other part is highly heated, operation of the burner is stopped and the blower is started by bringing the furnace first into a horizontal position and then inclining it little by little as the level of the bath reaches and slightly exceeds that of the blower nozzles. The furnace works thus as a converter: the heat produced by the exothermic reactions of oxidation is sufficient to melt the remaining part of the charge and maintain it in the molten state until a copper concentration of 97-98% in the bath is obtained. During this operation the combusion gases and the volatile products reach through the conduit 12 the apparatus for recovering said products and the heat. While in the known processes, at this stage of the work, owing to the cooling of the converter, the refining should be continued in a reverberatory furnace, in the process according to this invention it will be sufficient to return the furnace to its horizontal position, resume the heating by operating the burner and operate again the blower, which, at this stage, blows the air on the bath refining it through oxidation to about 99.8%. The work ends with the removal of gases and reduction of the bath by poling of course on previously removing the door 10. The refined copper is at last discharged through the furnace outlet.

What I claim is:

A process of melting, converting and refining copper and recovering zinc from residues of alloys containing such materials, consisting in introducing the material to be treated together with slag-forming substances and substances developing heat during oxidation, into a retort shaped furnace tiltable on a horizontal axis, sealing the feed opening of the furnace and tilting the latter into the horizontal position, heating the charge at its free surface, stopping the heating when a part of the charge is melted, blowing air into the charge, tilting back simultaneously and gradually the furnace in such manner that, as the metal melts, the level of the melted portion covers somewhat the nozzle openings, discharging continuously the volatile products from the furnace for their recovery during blowing, returning the furnace to its horizontal position when there is a tendency to cooling, resuming heating and then blowing air to activate combustion and finally poling the charge.

VOLF STERENTAL.